(12) United States Patent
Ohno

(10) Patent No.: US 11,377,002 B2
(45) Date of Patent: Jul. 5, 2022

(54) VEHICLE OCCUPANT PROTECTION DEVICE

(71) Applicant: Toyota Jidosha Kabushiki Kaisha, Toyota (JP)

(72) Inventor: Mitsuyoshi Ohno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 517 days.

(21) Appl. No.: 16/582,133

(22) Filed: Sep. 25, 2019

(65) Prior Publication Data

US 2020/0130543 A1    Apr. 30, 2020

(30) Foreign Application Priority Data

Oct. 29, 2018   (JP) .............................. JP2018-202671

(51) Int. Cl.
 *B60N 2/42*      (2006.01)
 *B60N 2/888*     (2018.01)
 *B60R 21/207*    (2006.01)
 *B60R 21/05*     (2006.01)
 *B60R 21/013*    (2006.01)

(52) U.S. Cl.
 CPC .............. *B60N 2/42* (2013.01); *B60N 2/888* (2018.02); *B60R 21/013* (2013.01); *B60R 21/05* (2013.01); *B60R 21/207* (2013.01); *B60R 2021/2074* (2013.01)

(58) Field of Classification Search
 CPC ........ B60N 2/42; B60N 2/888; B60R 21/013; B60R 21/05; B60R 21/207; B60R 21/2074

USPC ........................................................ 296/68.1
See application file for complete search history.

(56) References Cited

U.S. PATENT DOCUMENTS

| | | | | |
|---|---|---|---|---|
| 4,468,051 A | * | 8/1984 | Kobayashi | B60N 2/143 |
| | | | | 280/751 |
| 11,066,038 B2 | * | 7/2021 | Sekizuka | B60N 2/4221 |
| 2002/0167157 A1 | | 11/2002 | Matsumoto et al. | |
| 2005/0248131 A1 | * | 11/2005 | Mori | B60R 21/213 |
| | | | | 280/728.1 |
| 2009/0085338 A1 | * | 4/2009 | Tanaka | B60R 21/05 |
| | | | | 280/752 |

(Continued)

FOREIGN PATENT DOCUMENTS

| | | | | |
|---|---|---|---|---|
| CN | 1660638 A | * | 8/2005 | ............. B60R 21/05 |
| CN | 113734007 A | * | 12/2021 | ............. B60K 37/02 |

(Continued)

*Primary Examiner* — Hilary L Gutman
(74) *Attorney, Agent, or Firm* — Dinsmore & Shohl LLP

(57) ABSTRACT

A vehicle occupant protection device includes a vehicle seat, a steering wheel, a steering moving mechanism, and a control unit. The vehicle seat includes a seat back and a headrest, the vehicle seat being configured to turn between a position where the vehicle seat is directed toward a vehicle front side and a position where the vehicle seat is directed toward a vehicle rear side. The steering wheel is provided ahead of the vehicle seat in a vehicle front-rear direction. The steering moving mechanism is configured to change a position of the steering wheel. The control unit is configured to move the steering wheel to a support position where the seat back and the headrest are supported by the steering wheel from the vehicle front side, by the steering moving mechanism, when the vehicle seat is directed toward the vehicle rear side.

6 Claims, 7 Drawing Sheets

(56) References Cited

U.S. PATENT DOCUMENTS

| | | | |
|---|---|---|---|
| 2016/0272141 A1* | 9/2016 | Oh ..................... | B60R 21/01554 |
| 2016/0375860 A1* | 12/2016 | Lubischer .............. | B62D 1/183 |
| | | | 74/493 |
| 2019/0016294 A1* | 1/2019 | Hayashi ................ | B60R 21/233 |
| 2020/0269800 A1* | 8/2020 | White ..................... | B60N 2/14 |
| 2021/0221263 A1* | 7/2021 | Jost ..................... | B60N 2/0276 |

FOREIGN PATENT DOCUMENTS

| | | | | |
|---|---|---|---|---|
| DE | 102010013173 A1 * | 9/2011 | ............. | B60R 21/05 |
| FR | 3106115 A1 * | 7/2021 | ............. | B60R 21/05 |
| JP | 2004-189109 A | 7/2004 | | |
| JP | 2007-022535 A | 2/2007 | | |
| JP | 2007-076647 A | 3/2007 | | |
| JP | 2007-261299 A | 10/2007 | | |
| JP | 2017-206120 A | 11/2017 | | |
| JP | 2019-123333 A | 7/2019 | | |

* cited by examiner

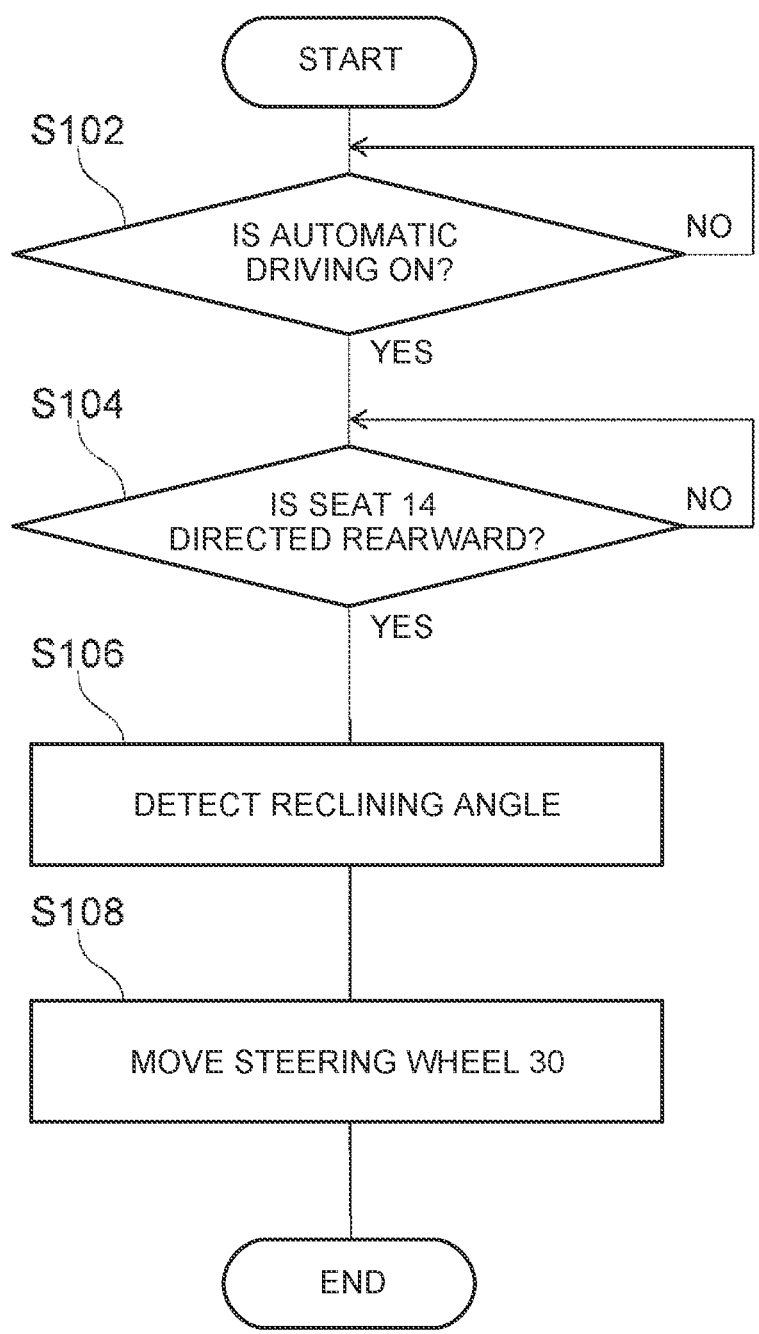

VEHICLE OCCUPANT PROTECTION DEVICE

CROSS-REFERENCE TO RELATED APPLICATIONS

This application claims priority to Japanese Patent Application No. 2018-202671 filed on Oct. 29, 2018, which is incorporated herein by reference in its entirety including the specification, drawings and abstract.

BACKGROUND

1. Technical Field

The disclosure relates to a vehicle occupant protection device.

2. Description of Related Art

In Japanese Patent Application Publication No. 2017-206120 (JP 2017-206120 A), there is disclosed a configuration that is equipped with a seat that is configured to rotate in a horizontal direction. By rotating the seat by 180°, a driver can face an occupant sitting in a rear seat. Besides, in Japanese Patent Application Publication No. 2017-206120 (JP 2017-206120 A), an airbag to be actuated is selected in accordance with a rotational angle of the seat. By the same token, in Japanese Patent Application Publication No. 2004-189109 (JP 2004-189109 A), there is disclosed a configuration in which a driver seat is equipped with a seat that is configured to rotate by 180°. On the other hand, in Japanese Patent Application Publication No. 2007-261299 (JP 2007-261299 A), there is disclosed an art of moving a steering wheel to an optimal position tor restraining a driver when a collision of a vehicle is predicted.

SUMMARY

By the way, a larger collision load is likely to be applied when the vehicle undergoes a frontal collision with the driver seal directed toward a vehicle rear side by being rotated by 180°, than when the vehicle undergoes a rear-end collision with the driver seat directed toward a vehicle front side. Therefore, a seat back and a headrest may deform as a result of interfering with peripheral parts in a cabin. On the other hand, when the seat back and the headrest are reinforced, the seat increases in weight.

In view of the aforementioned facts, the disclosure ensures that the headrest and the seat back can be restrained from deforming even when the vehicle undergoes a frontal collision with the driver seat directed toward the vehicle rear side, while restraining the seat from increasing in weight.

A vehicle occupant protection device according to a first aspect of the disclosure includes a vehicle seat, a steering wheel, a steering moving mechanism, and a control unit. The vehicle seat includes a seat back that is configured to support a back of an occupant, and a headrest that is configured to support a head of the occupant, the vehicle seat being configured to turn between a position where the vehicle seat is directed toward a vehicle front side and a position where the vehicle seat is directed toward a vehicle rear side. The steering wheel is provided ahead of the vehicle seat in a vehicle front-rear direction. The steering moving mechanism is configured to change a position of the steering wheel. The control unit is configured to move the steering wheel to a support position where the seat back and the headrest are supported by the steering wheel from the vehicle front side, by the steering moving mechanism, when the vehicle seat is directed toward the vehicle rear side.

In the vehicle occupant protection device according to the foregoing aspect, the vehicle seat includes the seat back and the headrest. Besides, the vehicle seat is configured to turn between the position where the vehicle seat is directed toward the vehicle front side and the position, where the vehicle seat is directed toward the vehicle rear side. Therefore, the vehicle seat is directed toward the vehicle front side at the time of driving, and can be directed toward the vehicle rear side by being turned by 180° when the occupant does not drive, for example, at the time of automatic driving or the like.

It should be noted herein that the steering wheel is provided ahead of the vehicle seat in the vehicle front-rear direction, and that this steering wheel is configured to be changed in position by the steering moving mechanism. Thus, the steering wheel can be moved to an arbitrary position in accordance with a driving position of the occupant.

Besides, the vehicle occupant protection device includes the control unit. This control unit moves the steering wheel to the support position where the seat back and the headrest are supported by the steering wheel from the vehicle front side, by the steering moving mechanism, when the vehicle seat is directed toward the vehicle rear side. Thus, the seat back and the headrest, which are about to move toward the vehicle front side in the event of a frontal collision of the vehicle, can be supported from the vehicle front side by the steering wheel.

As described above, the vehicle occupant protection device of the first aspect of the disclosure makes it possible to restrain the headrest and the seat back from deforming even when the vehicle undergoes a frontal collision with the driver seat directed toward the vehicle rear side, while restraining the seat from increasing in weight.

In the vehicle occupant protection device according to the foregoing aspect, the steering moving mechanism may include a tilt mechanism that is configured to adjust a height of the steering wheel, and a telescopic mechanism that is configured to adjust a position of the steering wheel in the vehicle front-rear direction, and the control unit may be configured to move the steering wheel to the support position, by at least one of the tilt mechanism and the telescopic mechanism.

In the vehicle occupant protection device according to the foregoing aspect, the steering wheel is moved to the support position by at least one of the tilt mechanism and the telescopic mechanism. Thus, the seat back and the headrest can be supported by the steering wheel through the use of the existing mechanisms, without using any dedicated mechanism.

The vehicle occupant protection device according to the foregoing aspect makes it possible to restrain the number of parts from increasing.

In the vehicle occupant protection device according to the foregoing aspect, the steering wheel may include a hub portion that is located at a center of the steering wheel, and a rim portion that is arranged around the hub portion. The hub portion may be abut on the seat back, and an upper portion of the rim portion may abut on the headrest, at the support position.

In the vehicle occupant protection device according to the foregoing aspect, the headrest can be supported by the rim portion as a relatively highly rigid portion of the steering wheel.

In the vehicle occupant protection device according to the foregoing aspect, an in-headrest load transmission member may be provided inside the headrest, the in-headrest load transmission member facing the rim portion of the steering wheel in the vehicle front-rear direction at the support position.

In the vehicle occupant protection device according to the foregoing aspect, a collision load can be effectively transmitted from the headrest to the steering wheel through the in-headrest load transmission member.

The vehicle occupant protection device according to the foregoing aspect makes it possible to effectively restrain the headrest from deforming.

In the vehicle occupant protection device according to the foregoing aspect, one end side of the in-headrest load transmission member may face the rim portion in the vehicle front-rear direction at the support position, and the other end side of the in-headrest load transmission member may be fixed to a headrest stay that couples the headrest and the seat back to each other.

In the vehicle occupant protection device according to the foregoing aspect, a reaction force that is applied to the in-headrest load transmission member from the steering wheel is distributed to the seat back through the headrest stay. Thus, the reaction force can be restrained from being applied to the occupant from the steering wheel.

The vehicle occupant protection device according to the foregoing aspect makes it possible to enhance the performance of protecting the occupant.

In the vehicle occupant protection device according to the foregoing aspect, an in-seat back load transmission member may be provided inside the seat back, and the in-seat back load transmission member may face the rim portion of the steering wheel in the vehicle front-rear direction at the support position.

In the vehicle occupant protection device according to the foregoing aspect, a collision load can be effectively transmitted from the seat back to the steering wheel through the in-seat back load transmission member.

The vehicle occupant protection device according to the foregoing aspect makes it possible to effectively restrain the seat back from deforming.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a flowchart showing the flow of a steering moving process according to the embodiment.

DETAILED DESCRIPTION OF EMBODIMENT

A vehicle occupant protection device 10 according to the embodiment will be described with reference to the drawings. Incidentally, arrows FR, UP, and RH depicted as appropriate in the respective drawings indicate a forward direction along a vehicle front-rear direction, an upward direction along a vehicle vertical direction, and a rightward direction along a vehicle width direction respectively. In the case where the front-rear direction, the vertical direction, and the lateral direction are used in the following description, the front-rear direction with respect to a vehicle, the vertical direction with respect to the vehicle, and the lateral direction when directed forward with respect to the vehicle are meant respectively, unless otherwise specified.

Figure 1:
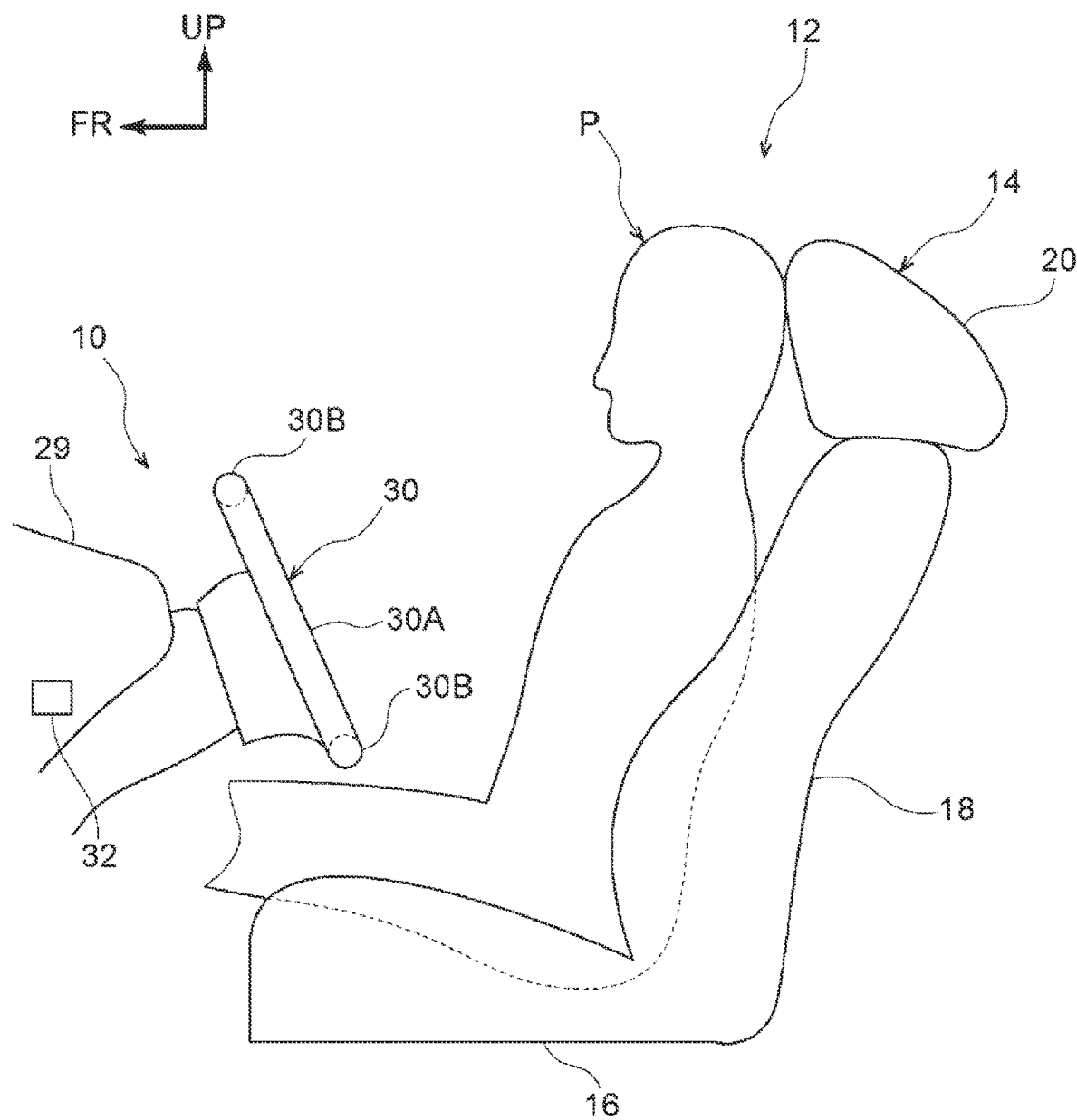
FIG. 1 is a lateral view showing the periphery of a driver seat of a vehicle that includes a vehicle occupant protection device according to the embodiment.

As shown in FIG. 1, a driver seat 12 is arranged in a front portion of a cabin of the vehicle to which the vehicle occupant protection device 10 according to the present embodiment is applied, and a vehicle seat 14 is provided in the driver seat 12. Incidentally, the following description will be given on the assumption that an occupant P sitting in the vehicle seat 14 is directed toward a seat front side, and that a seat width direction extends along the vehicle width direction with the vehicle seat 14 directed forward or rearward in the vehicle front-rear direction. Besides, the vehicle according to the embodiment is a so-called automatically guided vehicle that can be caused to run automatically. Moreover, the vehicle is configured to make a changeover between a manual driving mode in which the occupant P manually drives the vehicle, and an automatic driving mode in which the vehicle runs automatically.

Figure 2:
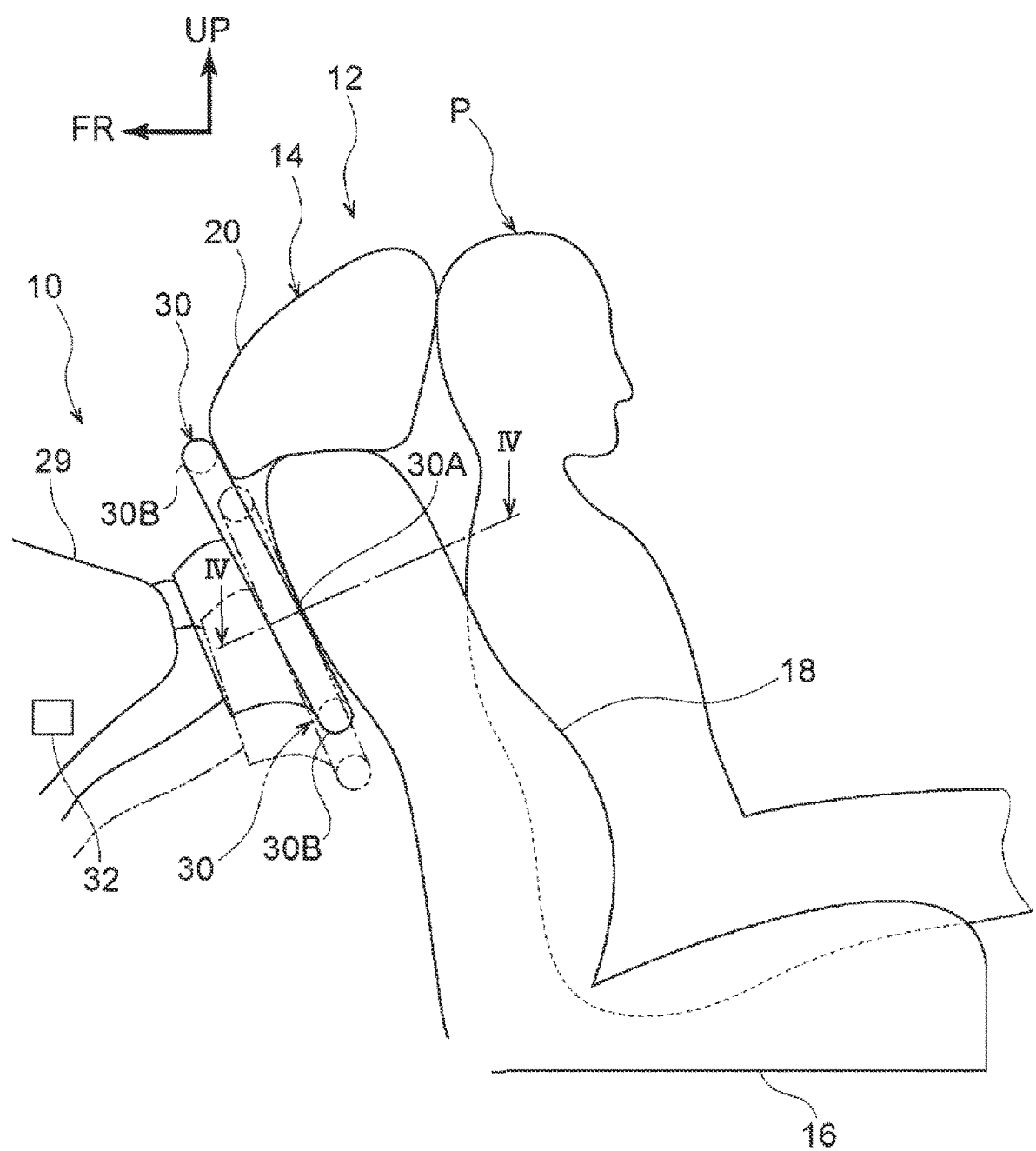
FIG. 2 is a lateral view showing a state where a vehicle seat has been turned by 180° from a state of FIG. 1.

The vehicle seat 14 is configured to include a seal cushion 16, a seat back 18, and a headrest 20. The vehicle seat 14 is configured to turn between a position where the vehicle seat 14 is directed toward a vehicle front side and a position where the vehicle seat 14 is directed toward a vehicle rear side. Furthermore, FIG. 1 shows a state where the vehicle seat 14 is directed toward the vehicle front side, and FIG. 2 shows a state where the vehicle seat 14 is directed toward the vehicle rear side.

The seat cushion 16 is attached in such a manner as to turn in a horizontal direction with respect to a floor in the cabin (not shown), and is configured to support a hip and thighs of the occupant P from below with respect to the vehicle. Moreover, the seat back 18 is coupled to an end portion of this seat cushion 16 on a seat rear side, in such a manner as to turn in a seat front-rear direction.

The seat back 18 is extended in the vertical direction. An end portion of this seat back 18 on a seat lower side is coupled, in a turning manner, to the seat cushion 16. Moreover, this seat back 18 is configured to support a back of the occupant P.

Figure 4:
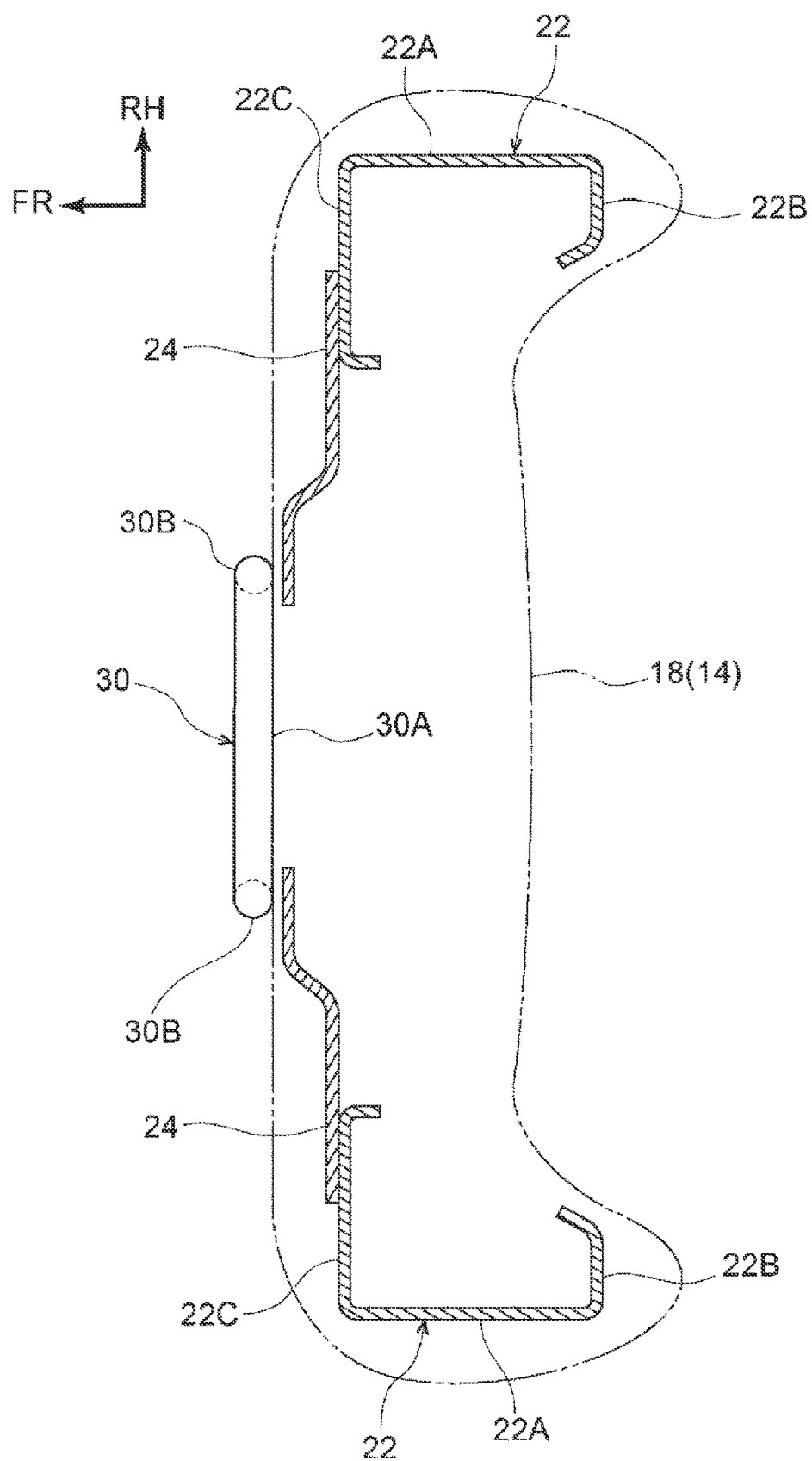
FIG. 4 is an enlarged cross-sectional view schematically showing a part along a line IV-IV of FIG. 2 on an enlarged scale.

As shown in FIG. 4, seat back frames 22 and first load transmission members 24 as in-seat back load transmission members are provided inside the seat back 18. The seat back frames 22 are members that form a skeleton of the seat back 18. The seat back frames 22 are provided as a pair of right and left frames and are extended in the vehicle vertical direction. Besides, an upper portion of the seat back 18 is provided with an upper frame (not shown) that couples the right and left seat back frames 22 to each other in the seat width direction.

It should be noted herein that each of the seat back frames 22 is formed with a substantially J-shaped cross-section, namely, a cross-section opened in the seat width direction as viewed from above with respect to the vehicle. In concrete terms, each of the seat back frames 22 is configured to include a lateral wall portion 22A that is extended in the seat front-rear direction, a front wall portion 22B that is extended inward in the seat width direction from an end portion of the lateral wall portion 22A on the seat front side, and a rear wall portion 22C that is extended inward in the seat width direction from an end portion of the lateral wall portion 22A on the seat rear side.

A tip portion of the front wall portion 22B is curved toward the seat rear side along a contour of the seat back 18. Besides, a tip of the rear wall portion 22C is curved toward the seat front side. Moreover, each of the first load transmission members 24 is fixed to this rear wall portion 22C. The details of the first load transmission members 24 will be described later.

As shown in FIG. 1, the headrest 20 is coupled to an end portion of the seat back 18 on a seat upper side. This headrest 20 is configured to support a head of the occupant P from the seat rear side.

Figure 3:
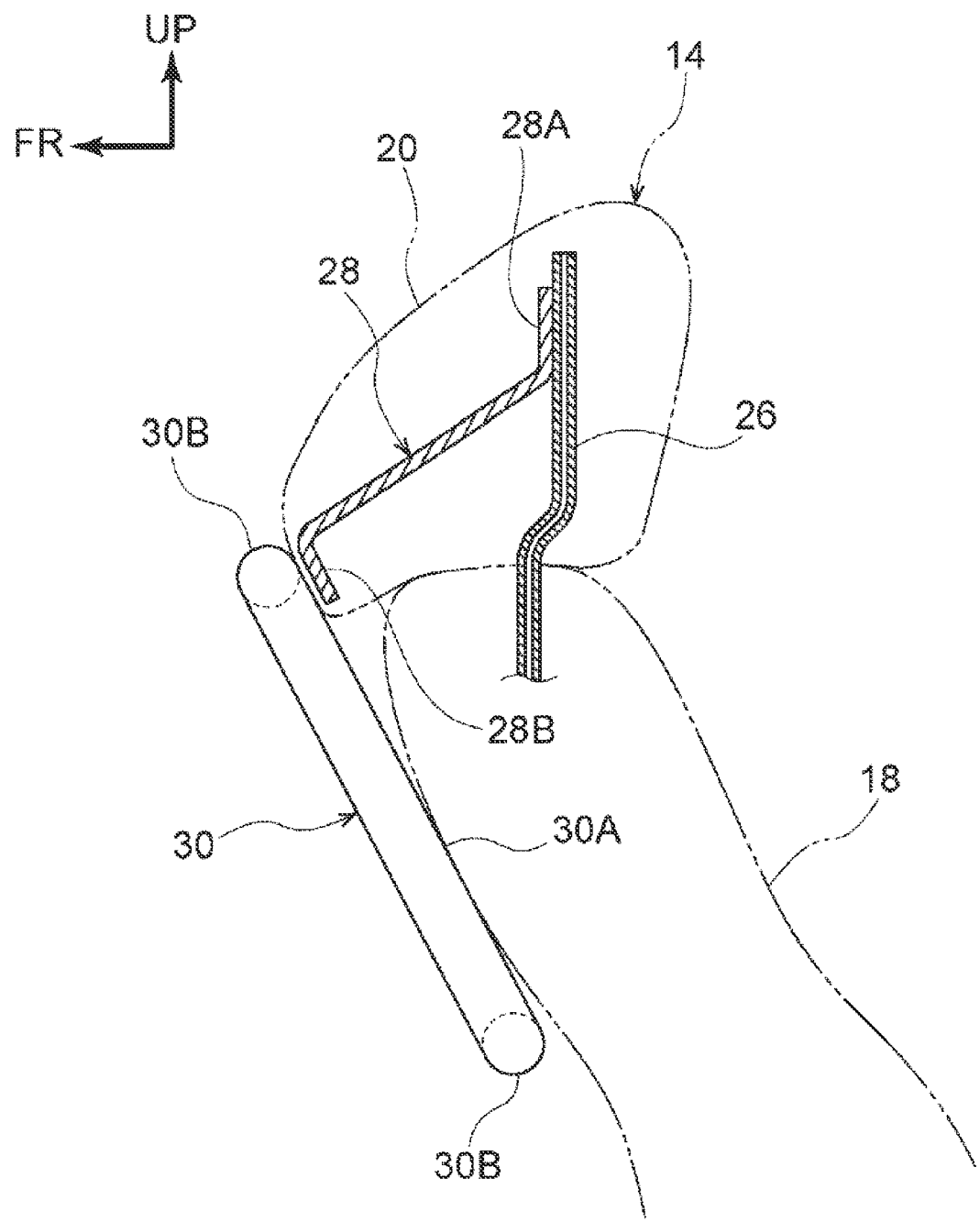
FIG. 3 is a schematic view schematically showing a part of a headrest that constitutes the vehicle seat according to the embodiment.

As shown in FIG. 3, one of headrest stays 26 that are extended in the vertical direction is provided inside the headrest 20. A lower end portion of this headrest stay 26 is coupled to an upper frame (not shown) of the seat back 18.

It should be noted herein that a pair of the right and left headrest stays 26 are provided (only one of the headrest stays 26 is shown in FIG. 3). The headrest stays 26 are provided with second load transmission members 28 as in-headrest load transmission members, respectively. The details of the second load transmission members will be described later.

As shown in FIG. 1, a steering wheel 30 is provided ahead of the vehicle seat 14 in the vehicle front-rear direction. The steering wheel 30 is provided at a tip of a steering column (not shown) that is extended in the vehicle front-rear direction. The steering wheel 30 is configured to include a hub portion 30A that is located at a center thereof, and a rim portion 30B that is arranged around the hub portion 30A and that is gripped by the occupant. Besides, the hub portion 30A and the rim portion 30B are coupled to each other by a spoke (not shown).

It should be noted herein that an instrument panel 29 is provided ahead of the steering wheel 30 in the vehicle front-rear direction. An electronic control unit (an ECU) 32 as a control unit is provided inside this instrument panel 29. Moreover, the vehicle occupant protection device 10 according to the present embodiment is configured to include the ECU 32.

Figure 5:
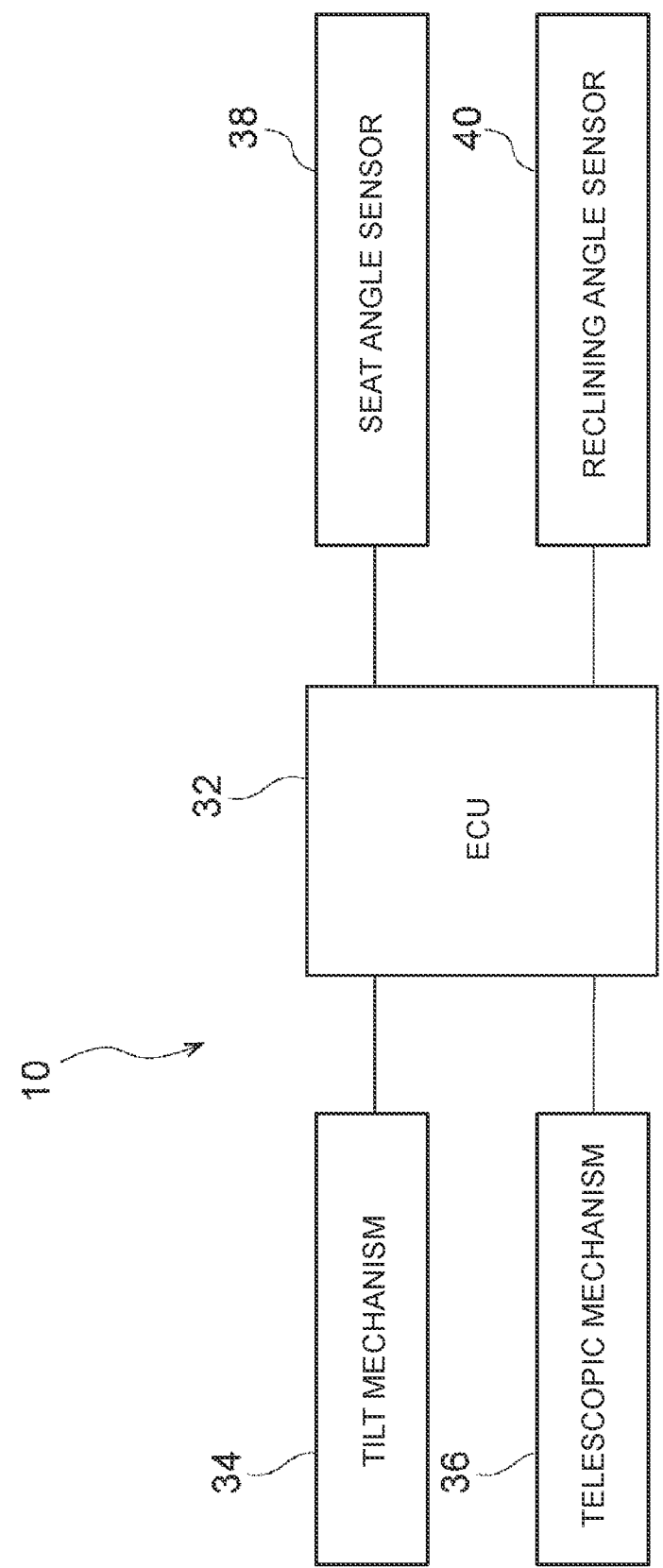
FIG. 5 is a block diagram, showing the hardware configuration of the vehicle occupant protection device according to the embodiment.

FIG. 5 is a block diagram showing the hardware configuration of the vehicle occupant protection device 10. As shown in this FIG. 5, the vehicle occupant protection device 10 is configured to include the ECU 32, a tilt mechanism 34, a telescopic mechanism 36, a seat angle sensor 38, and a reclining angle sensor 40. Moreover, the ECU 32 is electrically connected to the tilt mechanism 34, the telescopic mechanism 36, the seat angle sensor 38, and the reclining angle sensor 40.

It should be noted herein that a steering moving mechanism is configured to include the tilt mechanism 34 and the telescopic mechanism 36. The tilt mechanism 34 is a mechanism that is configured to adjust the height of the steering wheel 30 by changing the angle of the steering column. The telescopic mechanism 36 is a mechanism that is configured to adjust the position of the steering wheel 30 in the vehicle front-rear direction. Moreover, this tilt mechanism 34 and this telescopic mechanism 36 are configured to change the position of the steering wheel 30 to an arbitrary position. Incidentally, a known technology is applicable to the tilt mechanism 34 and the telescopic mechanism 36, so the detailed description of these mechanisms will be omitted.

The seat angle sensor 38 is a sensor that detects a turning angle of the vehicle seat 14 with respect to the horizontal direction. It should be noted herein that the vehicle seat 14 of the present embodiment is configured to be set at two angles, namely, at an angle of 0° at which the vehicle seat 14 is directed toward the vehicle front side, and at an angle of 180° at which the vehicle seat 14 is directed toward the vehicle rear side. Therefore, the seat angle sensor 38 detects whether the angle of the vehicle seat 14 is equal to 0° or 180°.

The reclining angle sensor 40 is a sensor that detects a reclining angle of the seat back 18 with respect to the seat cushion 16.

Figure 6:
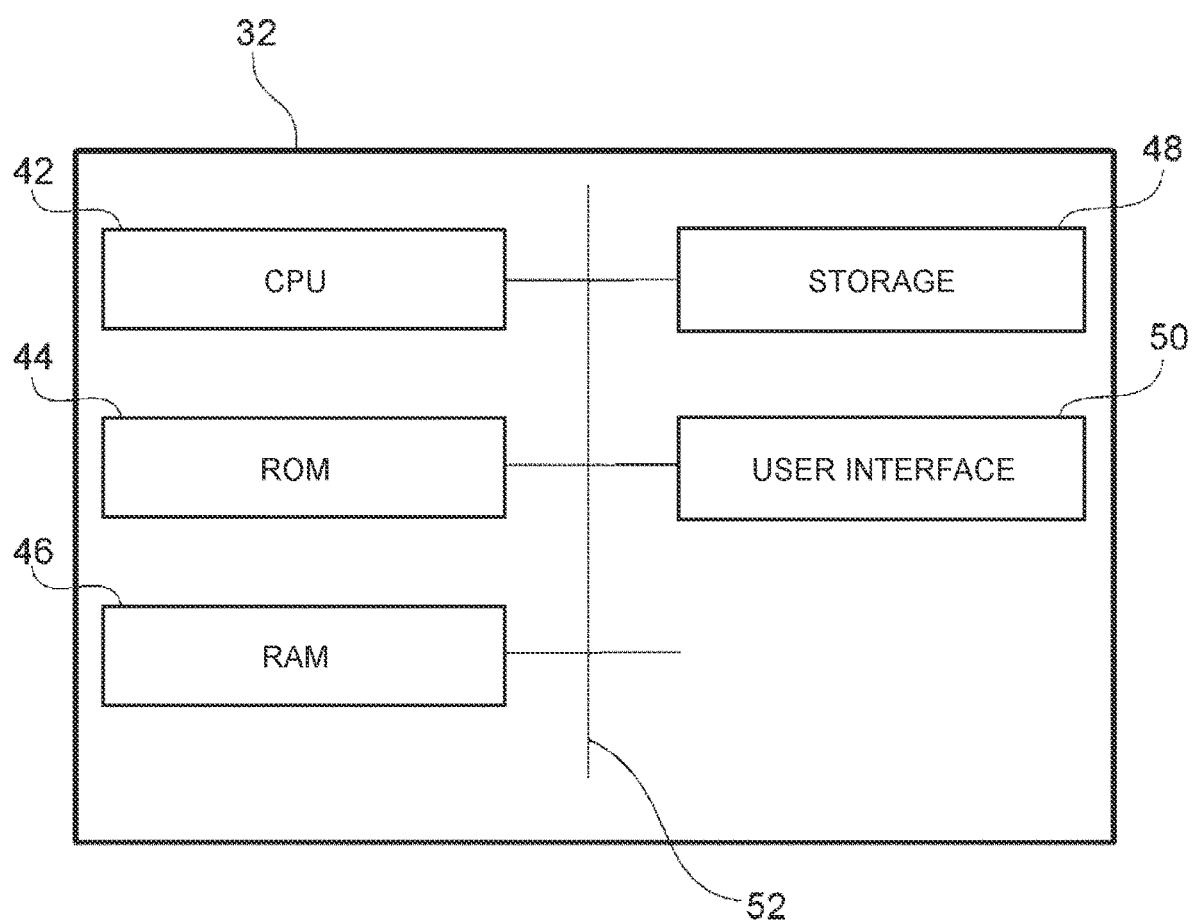
FIG. 6 is a block diagram showing the hardware configuration of an ECU that constitutes the vehicle occupant protection device according to the embodiment.

FIG. 6 is a block diagram showing the hardware configuration of the ECU 32. As shown in this FIG. 6, the ECU 32 is configured to include a central processing unit or a processor (a CPU) 42, a read only memory (a ROM) 44, a random access memory (a RAM) 46, a storage 48, and a user interface 50. The respective components are connected in such a manner as to communicate with one another via a bus 52.

The CPU 42 is a central processing unit that executes various programs and that controls respective regions. That is, the CPU 42 reads out the programs from the ROM 44 or the storage 48, and executes the programs using the RAM 46 as a work area. The CPU 42 performs the control of the aforementioned respective components and various arithmetic operations in accordance with the programs stored in the ROM 44 or the storage 48.

The ROM 44 stores the various programs and various data. The RAM 46 temporarily stores the programs or data as the work area. The storage 48 is configured as a hard disk drive (an HDD) or a solid state drive (an SSD), and stores the various programs including all operating system, and the various data.

The user interface 50 is an interface that enables the occupant P to perform various operations, and includes, for example, at east one of a liquid crystal display that includes a touch panel, a voice input unit, and a button that can be pressed down.

Next, the first load transmission members 24 that are provided in the seat back 18, and the second load transmission members 28 that are provided in the headrest 20 will be described.

As shown in FIG. 4, each of the first load transmission members 24 is formed substantially in the shape of a plate, and is extended in the seat width direction. An end portion of each of these first load transmission members 24 on an outer side in the seat width direction is fixed to the rear wall portion 22C of each of the seat back frames (side frames) 22 through welding or the like.

On the other hand, an end portion of each of the first load transmission members 24 on an inner side in the seat width direction is extended to a central region of the seat back 18 in the seat width direction, and is located rearward of a region of the seat back 18 on the outer side in the seat width direction in the seat front-rear direction. Moreover, the end portion of each of these first load transmission members 24 on the inner side in the seat width direction faces the rim portion 30B of the steering wheel 30 in the vehicle front-rear direction, with the vehicle seat 14 directed toward the vehicle rear side.

As shown in FIG. 3, each of the second load transmission members 28 is a substantially plate-like member that is bridged between the pair of the right and left headrest stays 26, and is inclined toward the seat lower side, front the seat, front side toward the seat rear side as viewed from the seat width direction.

A front flange portion 28A that is flexed toward the seat upper side along each of the headrest stays 26 is formed at an end portion of each of the second load transmission members 28 on the seat front side. This front flange portion 28A is fixed to each of the headrest stays 26 through welding or the like.

Besides, a rear flange portion 28B that is flexed toward the seat lower, side along a contour of the headrest 20 is formed at an end portion of each of the second load transmission members 28 on the seat rear side. Moreover, this rear flange portion 28B faces the rim portion 30B of the steering wheel 30 in the vehicle front-rear direction, with the vehicle seat 14 directed toward the vehicle rear side.

Incidentally, the position of the steering wheel 30 in FIGS. 3 and 4 is a position to which the steering wheel 30 has been moved by the tilt mechanism 34 and the telescopic mechanism 36, which constitute the steering moving mechanism. The flow of a steering moving process for moving the steering wheel 30 will be described with reference to a flowchart of FIG. 7. For example, the CPU 42 reads out the programs from the ROM 44 or the storage 48, expands the programs to the RAM 46, and executes the programs, thereby performing the steering moving process.

As shown in FIG. 7, the CPU 42 determines in step S102 whether or not automatic driving has been turned ON. For example, when automatic driving of the vehicle is started through an operation by the occupant P, a signal indicating the start of automatic driving is transmitted to the ECU 32, and it may be determined from this signal that automatic driving has been turned ON.

If it is determined in step S102 that automatic driving has been turned ON, the CPU 42 makes a transition to the processing of step S104. Besides, if it is not determined in step S102 that automatic driving has been turned ON, namely, if it is determined in step S102 that automatic driving is OFF, the CPU 42 repeatedly performs the processing of step S102.

The CPU 42 determines in step S104 whether or not the vehicle seat 14 is directed toward the vehicle rear side. In this case, when the angle of the vehicle seat 14 detected by the seat angle sensor 38 (see FIG. 5) is equal to 180°, the CPU 42 determines that the vehicle seat 14 is directed toward the vehicle rear side.

Incidentally, in the present embodiment, the turning, mechanism of the vehicle seat 14 is configured to be locked to keep the vehicle seat 14 directed toward the vehicle front side, if it is not determined in step S102 that automatic driving has been turned ON.

If it is determined in step S104 that the vehicle seat 14 is directed toward the vehicle rear side, the CPU 42 makes a transition to the processing of step S106. Besides, if it is determined in step S104 that the vehicle seat 14 is not directed toward the vehicle rear side, namely, if the vehicle seat 14 is directed toward the vehicle front side, the CPU 42 repeatedly performs the processing of step S104.

The CPU 42 detects a reclining angle of the seat back 18 of the vehicle seat 14 in step S106. In concrete terms, the CPU 42 detects the reclining angle of the seat back 18 by receiving information on the reclining angle detected by the reclining, angle sensor 40 (see FIG. 5).

The CPU 42 moves the steering, wheel 30 in step S108. In the present embodiment, the CPU 42 moves the steering wheel 30 to the support position where the seat back 18 and the headrest 20 are supported from the vehicle front side, as shown in FIG. 2, by actuating both the tilt mechanism 34 and the telescopic mechanism 36. Then, the steering moving process is ended.

It should be noted herein that a long and two short dashes line indicates a state where the steering wheel 30 has not been moved yet, and a solid line indicates a state where the steering wheel 30 has been moved to the support, position in FIG. 2. Also, at the support position, the hub portion 30A of the steering wheel 30 is held in abutment on a surface of the seat back 18 on the seat rear side, and an upper portion of the rim portion 30B is held in abutment on a surface of the headrest 20 on the seat rear side.

Besides, in the present embodiment, the steering wheel 30 is configured to be moved to the support position where the seat back 18 can be effectively supported from the seat rear side, by detecting the reclining angle of the seat back 18. For example, when the reclining angle of the seat back 18 is large, namely, when the seat back 18 has fallen toward the seat rear side, the angle of the steering wheel 30 is increased in accordance with the inclination of the surface of this seat back 18 on the seat rear side.

It should be noted herein that the end portion of each of the first load transmission members 24 on the inner side in the seat width direction faces the rim portion 30B of the steering wheel 30 in the vehicle front-rear direction, with the steering wheel 30 moved to the support position, as shown in FIG. 4. Besides, the hub portion 30A of the steering wheel 30 abuts on the surface of the seat back 18 on the seat rear side.

Besides, as shown in FIG. 3, the rear flange portion 28B of each of the second load transmission members 28 faces the rim portion 30B of the steering wheel 30 in the vehicle front-rear direction, with the steering wheel 30 moved to the support position.

Incidentally, the steering wheel 30 is returned to its original position by the tilt mechanism 34 and the telescopic mechanism 36, by turning the vehicle seat 14 front the state where the vehicle seat 14 is directed toward the vehicle rear side to the state where the vehicle seat 14 is directed toward the vehicle front side.

Next, the operation of the present embodiment will be described.

In the vehicle occupant protection device 10 according to the present embodiment, as shown in FIGS. 1 and 2, the vehicle seat 14 is configured turnably between the position where the vehicle seat 14 is directed toward the vehicle front side and the position where the vehicle seat 14 is directed toward the vehicle rear side. Therefore, in the manual driving mode, the vehicle seat 14 can be turned by 180° and directed toward the vehicle rear side in the case where the occupant P does not drive the vehicle, for example, in the automatic driving mode or the like. Thus, the occupant P can face and have a conversation or the like with an occupant sitting in a rear seat.

Besides, in the present embodiment, the tilt mechanism 34 and the telescopic mechanism 36 (see FIG. 5) constitute the steering moving mechanism. This steering moving mechanism is configured to change the position of the steering wheel 30. Thus, the steering wheel 30 can be moved to an arbitrary position in accordance with a driving position of the occupant P.

Furthermore, in the present embodiment, when the vehicle seat 14 is directed toward the vehicle rear side, the steering wheel 30 is moved to the support position by the tilt mechanism 34 and the telescopic mechanism 36. Then, at this support position, the steering wheel 30 can support the seat back 18 and the headrest 20 from the vehicle front side. Thus, the seat back 18 and the headrest 20, which are about to move toward the vehicle front side in the event of a frontal collision of the vehicle, can be supported by the steering wheel 30 from the vehicle front side.

It should be noted herein that the vehicle seat 14 is about to move toward the seat rear side through inertia both in the event of a rear-end collision with the vehicle seat 14 directed toward the vehicle front side, and in the event of a frontal collision with the vehicle seat 14 directed toward the vehicle rear side. On the other hand, when an oncoming vehicle runs toward the own vehicle in the event of a frontal collision, a larger collision load may be input thereto than in the event of a rear-end collision. Therefore, the seat back 18 and the headrest 20 are required to be restrained from deforming in the event of a frontal collision of the vehicle with the vehicle seat 14 directed toward the vehicle rear side.

In the present embodiment, as described above, the reinforcement of the seat back 18 and the headrest 20 can be minimized by supporting the seat back 18 and the headrest 20 from the vehicle front side with the aid of the steering wheel 30. That is, the headrest 20 and the seat back 18 can be restrained from deforming, while restraining the vehicle seat 14 from increasing in weight.

Besides, in the present embodiment, the steering wheel 30 is moved to the support position by the tilt mechanism 34 and the telescopic mechanism 36. Therefore, the seat back 18 and the headrest 20 can be supported by the steering wheel 30, without using any dedicated mechanism for moving the steering wheel 30 to the support position. As a result, the number of parts can be restrained from increasing. In particular, by actuating both the tilt mechanism 34 and the telescopic mechanism 36 as in the present embodiment, the position of the steering wheel 30 can be more finely controller than in the case where the steering wheel 30 is moved by actuating only one of the mechanisms.

Furthermore, in the present embodiment, as shown in FIG. 4, the rim portion 30B of the steering wheel 30 faces the first load transmission members 24 in the vehicle front-rear direction. Therefore, in the event of a frontal collision, a collision load can be effectively transmitted from the seat back 18 to the steering wheel 30 via the first load transmission members 24. As a result, the seat back 18 can be effectively restrained from deforming.

Furthermore, in the present embodiment, as shown in FIG. 3, the rim portion 30B of the steering wheel 30 faces each of the second load transmission members 28 in the vehicle front-rear direction. Therefore, in the event of a frontal collision, the headrest 20 can be supported by the rim portion 30B as a relatively highly rigid portion of the steering wheel 30. That is, a collision load can be effectively transmitted from the headrest 20 to the steering wheel 30 via the second load transmission members 28.

In particular, in the present embodiment, the front flange portion 28A of each of the second load transmission members 28 is fixed to each of the headrest stays 26. Therefore, a reaction force that is applied to each of the second load transmission members 28 from the steering wheel 30 can be distributed to the seat back 18. Thus, the reaction force can be restrained from being applied to the occupant P from the steering wheel 30. As a result, the performance of protecting the occupant P can be enhanced.

Although the embodiment has been described above, the disclosure can be carried out, as a matter of course, in various aspects within such a range as not to depart from the gist thereof. For example, in the aforementioned embodiment, the steering wheel 30 is moved to the support position by actuating both the tilt mechanism 34 and the telescopic mechanism 36, but the disclosure is not limited thereto. That is, it is appropriate to adopt a configuration in which the steering wheel 30 is moved to the support position by at least one of the tilt mechanism 34 and the telescopic mechanism 36.

Besides, when the vehicle seat 14 is turned and directed toward the vehicle rear side, the steering wheel 30 may be moved toward the vehicle front side by the telescopic mechanism 36. Thus, the space of the cabin can be widely utilized.

Besides, in the aforementioned embodiment, with the steering wheel 30 moved to the support position, the steering wheel 30 abuts on (is in contact with) the seat back 18 and the headrest 20, but the disclosure is not limited thereto. That is, there may be a gap between the steering wheel 30 and each of the seat back 18 and the headrest 20 as long as the steering wheel 30 is located at such a position as to support the seat back 18 and the headrest 20 in the event of a frontal collision.

Furthermore, in the aforementioned, embodiment, the reclining angle of the seat back 18 is detected, and the support position of the steering wheel 30 is adjusted in accordance with this reclining angle, but the disclosure is not limited thereto. For example, it is also appropriate to adopt a configuration in which the support position of the steering wheel 30 is set as a predetermined position and the steering wheel 30 is moved to the same support position regardless of the reclining angle of the seat back 18. In this case, a load sensor or the like may be mounted inside the steering wheel 30, and the steering wheel 30 may be stopped from moving upon coming into abutment on the seat back 18. Besides, when the vehicle seat 14 is directed toward the vehicle rear side, the reclining angle of the seat back 18 may be controlled to be adjusted to an optimal angle for support.

Furthermore, in the aforementioned embodiment, a so-called impact-absorbing steering that absorbs an impact in the event of a collision may be employed. In this case, when an impact is input to the steering wheel 30 from the seat back 18 and the headrest 20, the actuation of an impact-absorbing mechanism makes it possible to restrain a reaction force from being input to the occupant P.

Besides, in the aforementioned embodiment, the support position of the steering wheel 30 may be set as a position beyond a movable range that can be adjusted by the occupant P at the time of manual operation. In this case, the steering wheel 30 may be limited in such a manner as to be movable only within a predetermined range while the vehicle seat 14 is directed toward the vehicle front side, and the steering wheel 30 may be controlled in such a manner as to cancel this limitation when the vehicle seat 14 is directed toward the vehicle rear side.

Furthermore, in the aforementioned embodiment, as shown in FIG. 4, the first load transmission members 24 are provided inside the seat back 18, but the disclosure is not limited thereto. For example, a backboard constituting the seat back 18 may be formed of a hard member so that a collision load can be transmitted thereto. Besides, an energy-absorbing structure may be applied to the first load transmission members 24. Thus, in the initial stage of a collision, a collision load can be transmitted to the steering heel 30 via the first load transmission members 24, and then, at least part of the collision load can be absorbed through plastic deformation or the like of the first load transmission members 24.

Furthermore, in the aforementioned embodiment, as shown in FIG. 3, each of the second load transmission members 28 is provided inside the headrest 20, but the disclosure is not limited thereto. For example, it s also appropriate to adopt a configuration in which a space on the seat rear side of the headrest 20 is filled with a hard pad instead of the second load transmission members 28, and a collision load is transmitted by this hard pad. Besides, an energy-absorbing structure may be applied to the second load transmission members 28. Thus, in the initial stage of a collision, a collision load can be transmitted to the steering wheel 30 via the second load transmission members 28, and then, at least part of the collision load can be absorbed through plastic deformation or the like of the second load transmission members 28.

Besides, the steering wheel 30 of the aforementioned embodiment includes the substantially circular rim portion 30B, but the disclosure is not limited thereto. A steering wheel with its rim portion divided may be employed. For example, in the case where a steering wheel with grip portions provided on both right and left sides thereof is adopted, there is no rim portion at an upper portion of the steering wheel. Even in this case, the grip portions can be faced the headrest 20, and the headrest 20 can be supported from the seat rear side, by rotating the steering wheel by 90°. Incidentally, in this case, the steering mole of each of the tires is controlled to remain unchanged even when the steering wheel is rotated.

What is claimed is:

1. A vehicle occupant protection device comprising:
   a vehicle seat that includes a seat back that is configured to support a back of an occupant, and a headrest that is configured to support a head of the occupant, the vehicle seat being configured to turn between a position where the vehicle seat is directed toward a vehicle front side and a position where the vehicle seat is directed toward a vehicle rear side;
   a steering wheel that is provided ahead of the vehicle seat in a vehicle front-rear direction;
   a steering moving mechanism that is configured to change a position of the steering wheel; and
   a control unit that is configured to move the steering wheel to a support position where the seat back and the headrest are supported by the steering wheel from the vehicle front side, by the steering moving mechanism, when the vehicle seat is directed toward the vehicle rear side.

2. The vehicle occupant protection device according to claim 1, wherein:
   the steering moving mechanism includes a tilt mechanism that is configured to adjust a height of the steering wheel, and a telescopic mechanism that is configured to adjust the position of the steering wheel in the vehicle front-rear direction; and
   the control unit is configured to move the steering wheel to the support position, by at least one of the tilt mechanism and the telescopic mechanism.

3. The vehicle occupant protection device according to claim 1, wherein:
   the steering wheel includes a hub portion that is located at a center of the steering wheel, and a rim portion that is arranged around the hub portion; and
   the hub portion abuts on the seat back, and an upper portion of the rim portion abuts on the headrest, at the support position.

4. The vehicle occupant protection device according to claim 3, wherein an in-headrest load transmission member is provided inside the headrest, the in-headrest load transmission member facing the rim portion of the steering wheel in the vehicle front-rear direction at the support position.

5. The vehicle occupant protection device according to claim 4, wherein:
   one end side of the in-headrest load transmission member faces the rim portion in the vehicle front-rear direction at the support position; and
   the other end side of the in-headrest load transmission member is fixed to a headrest stay that couples the headrest and the seat back to each other.

6. The vehicle occupant protection device according to claim 3, wherein:
   an in-seat back load transmission member is provided inside the seat back; and
   the in-seat back load transmission member faces the rim portion of the steering wheel in the vehicle front-rear direction at the support position.

* * * * *